J. Offineer,
Hay Knife.
Nº 82,152.   Patented Sep. 15, 1868.
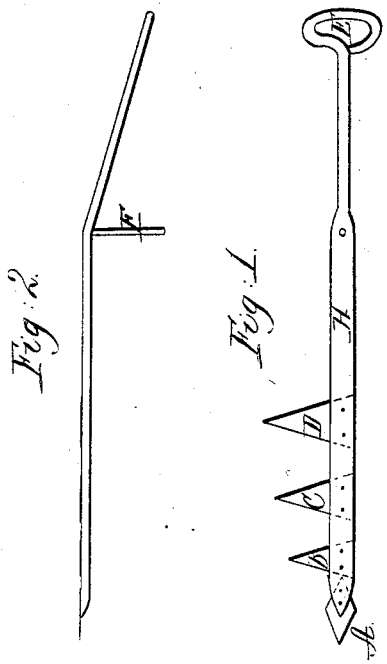
Witnesses:
Thad Coffin
E. Shopbell
Inventor:
James Offineer

UNITED STATES PATENT OFFICE.

JAMES OFFINEER, OF ASHLAND, OHIO.

IMPROVEMENT IN HAY-KNIVES.

Specification forming part of Letters Patent No. 82,152, dated September 15, 1868.

*To all whom it may concern:*

Be it known that I, JAMES OFFINEER, of Ashland, of the county of Ashland, State of Ohio, have invented a new and useful Improvement in Hay-Knives; and I do hereby declare that the following is a full and exact description of the same, reference being had to the accompanying drawings, and to the letters of reference marked thereon, in which—

Figure 1 is a perspective view of said knife; Fig. 2, a side view.

H in Fig. 1 is a strip of iron, of suitable length and proper thickness, to which are connected two handles, E and F. Also, a slight crook at the handle F is made, to prevent the upper hand from rubbing against the hay or straw while cutting.

Figure A is a two-edged lance-like-pointed knife, attached to the end of the rod H; and to the side of the rod H are attached three sharp oblong knives, of unequal length, respectively attached one above the other, and marked B C D, the middle one, C, being about one inch longer than the bottom one, and the upper one, D, about two inches longer.

In operating the knife the lance-pointed knife will cut both ways, thus opening the way for the easy entrance of the rod H, while the sawing-like action of the knives B C D cuts much faster and with greater ease than any other hay cutting device now in use.

What I claim as my improvement, and desire to secure by Letters Patent, is—

The knives A, B, C, and D, attached to the iron strip H, when arranged and combined as herein described, for the purpose set forth.

JAMES OFFINEER.

Witnesses:
 E. SHOPBELL,
 ROBT. MCMURRAY.